(12) United States Patent
Chen et al.

(10) Patent No.: US 11,567,030 B2
(45) Date of Patent: Jan. 31, 2023

(54) ELECTROCHEMICAL SENSOR

(71) Applicants: Rosemount Inc., Shakopee, MN (US); Regents of the University of Minnesota, Minneapolis, MN (US)

(72) Inventors: Xin Chen, Minneapolis, MN (US); Jinbo Hu, Minnetonka, MN (US); Philippe Buhlmann, Minneapolis, MN (US)

(73) Assignees: ROSEMOUNT INC., Shakopee, MN (US); REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 551 days.

(21) Appl. No.: 16/684,285

(22) Filed: Nov. 14, 2019

(65) Prior Publication Data

US 2021/0033561 A1 Feb. 4, 2021

Related U.S. Application Data

(60) Provisional application No. 62/879,886, filed on Jul. 29, 2019.

(51) Int. Cl.
| | |
|---|---|
| *G01N 27/333* | (2006.01) |
| *B01D 61/48* | (2006.01) |
| *B01D 67/00* | (2006.01) |
| *B01D 69/10* | (2006.01) |
| *B01D 71/40* | (2006.01) |
| *B01D 71/82* | (2006.01) |

(52) U.S. Cl.
CPC ....... *G01N 27/3335* (2013.01); *B01D 61/485* (2013.01); *B01D 67/0006* (2013.01); *B01D 69/10* (2013.01); *B01D 71/40* (2013.01); *B01D 71/82* (2013.01)

(58) Field of Classification Search
CPC .......................... G01N 27/3335; B01D 61/485
See application file for complete search history.

(56) References Cited

U.S. PATENT DOCUMENTS

| 7,208,121 B2 | 4/2007 | Peper et al. |
| 7,226,563 B2 | 6/2007 | Bakker et al. |
| 7,678,252 B2 | 3/2010 | Bakker et al. |
| 2003/0213691 A1 | 11/2003 | Peper et al. |
| 2003/0217920 A1 | 11/2003 | Peper et al. |
| 2008/0149501 A1 | 6/2008 | Heule et al. |
| 2018/0024087 A1 | 1/2018 | Hu et al. |

FOREIGN PATENT DOCUMENTS

| EP | 1936365 B1 | 3/2014 |
| WO | 2016/141337 A1 | 9/2016 |

OTHER PUBLICATIONS

Heng, Lee Yook and Hall, Elizabeth A. H., "Producing "Self-Plasticizing" Ion-Selective Membranes" Anal. Chem. 2000, 72, 42-51.
Qin, Y., et al. "Plasticizer-Free Polymer Containing a Covalently Immobilized Ca2+-Selective Ionophore for Potentiometric and Optical Sensors" Anal. Chem. 2003, 75, 3038-3045.
Peper, S., et al. "Plasticizer-Free Microspheres for Ionophore-Based Sensing and Extraction Based on a Methyl Methacrylate-Decyl Methacrylate Copolymer Matrix" Anal. Chim. Acta 2003, 500 (1), 127-136.
International Search Report issued for PCT/US2020/040486, dated Oct. 26, 2020.
Written Opinion of the International Searching Authority issued for PCT/US2020/040486, dated Oct. 26, 2020.
Examination Report issued for AU application serial No. 2020321806, dated Nov. 3, 2022.
Office Action issued for CN application serial No. 202010717982.1, dated Sep. 27, 2022, with English Translation.

*Primary Examiner* — Sikarl A Witherspoon
(74) *Attorney, Agent, or Firm* — Westman, Champlin & Koehler, P.A.; Z. Peter Sawicki; Amanda M. Prose

(57) ABSTRACT

An electrochemical sensor with an ion-selective membrane that comprises a crosslinked alkyl methacrylate homopolymer or copolymer of two or more alkyl methacrylates 1. with a covalently attached electrically neutral or electrically charged ionophore that is selective for a target cation or anion, or 2. with a covalently attached cationic or anionic ionic site, or 3. with a covalently attached cationic or anionic ionic site and covalently attached electrically neutral or electrically charged ionophore.

17 Claims, 8 Drawing Sheets

ELECTROCHEMICAL SENSOR

CROSS-REFERENCE TO RELATED APPLICATIONS

This application claims priority to and the benefit of U.S. Provisional Patent Application Ser. No. 62/879,886, filed on Jul. 29, 2019, the content of which is hereby incorporated in its entirety.

BACKGROUND

Glass electrodes with a solid-state glass membrane are the standard sensors for pH measurements. However, glass membranes have intrinsic disadvantages. Many types of glass membranes contain lead as a critical component and the removal of lead takes significant engineering resources and poses increased risks for glass cracking. The manufacture of glass electrodes requires extensive glass blowing expertise and is expensive. In addition, the fragility of glass is challenging in application areas such as food processing and implantable or wearable sensing.

Current glass electrodes require an internal fill solution to function, which limits their use in applications where small form factors are required. Protein adsorption onto the pH sensitive glass bulb results in fouling which requires frequent cleaning and maintenance. Glass electrodes are also difficult to miniaturize due to the high resistivity of glass.

Polymeric membranes are an alternative to solve some of the aforementioned challenges. Plasticized PVC membranes have become the conventional type of polymeric membrane Ion-selective electrodes (ISEs) with a wide range of pH ionophores developed successfully. These ionophores have functional groups that can be protonated such as in the case of amine and pyridine derivatives. However, the plasticizers used in a PVC-based membrane can leach out over time. This gradual loss of plasticizer not only undermines the functionality and selectivity of the selective membrane but can also cause inflammatory reactions, making plasticized polymers undesirable for use in areas such as long-term monitoring, the food and pharmaceutical industry, and implantable and wearable sensing applications.

SUMMARY

In one embodiment, this disclosure includes an electrochemical sensor with an ion-selective membrane comprising a crosslinked alkyl methacrylate homopolymer or copolymer of two or more alkyl methacrylates with a covalently attached electrically neutral or electrically charged ionophore that is selective for a target cation or anion.

In another embodiment this disclosure includes an electrochemical sensor with an ion-selective membrane comprising a crosslinked alkyl methacrylate homopolymer or copolymer of two or more alkyl methacrylates with a covalently attached cationic or anionic ionic site.

In yet another embodiment this disclosure includes an electrochemical sensor with an ion-selective membrane that comprises a crosslinked alkyl methacrylate homopolymer or copolymer of two or more alkyl methacrylates with a covalently attached cationic or anionic ionic site and covalently attached electrically neutral or electrically charged ionophore.

In a further embodiment this disclosure includes any one of the aforementioned sensors comprising a high surface area carbon solid contact.

In yet a further embodiment this disclosure includes sensors in which the covalently attached ionophore is selective for $H^+$ and contains as a functional group a primary, secondary, or tertiary amine, or a heterocyclic aromatic hydrocarbon such as pyridine, quinoline, or phenanthrene.

In yet a further embodiment this disclosure includes sensors in which the covalently attached ionic site contains as a functional group a tetraphenylborate group; a sulfonate group; a sulfonylimide group; or a sulfonylimide group in which one or two alkyl substituents of the sulfonylimide has 1, 2, 3, 4, 5, 6, 7, 8, 9, 10, 11, 12, 13, 14, 15, 16, 17, or 18 fluorine atoms attached.

In yet a further embodiment this disclosure includes sensors in which the alkyl methacrylate homopolymer or copolymer of two or more alkyl methacrylates comprises alkyl groups that are substituted with multiple fluorine atoms, making the polymer fluorous.

In yet a further embodiment this disclosure includes sensors that are prepared by polymerization of membrane components that comprise a salt that consists of an ion that comprises the ionic site functional group and a counter ion that is a complex of the ionophore and an exchangeable ion that may or may not be the target ion of the sensor.

This disclosure also includes an electrochemical sensor comprising a sensor body and an ion-selective membrane disposed on or within the sensor body, the ion-selective membrane comprising a crosslinked alkyl methacrylate homopolymer or copolymer.

DETAILED DESCRIPTION

Figure 1:
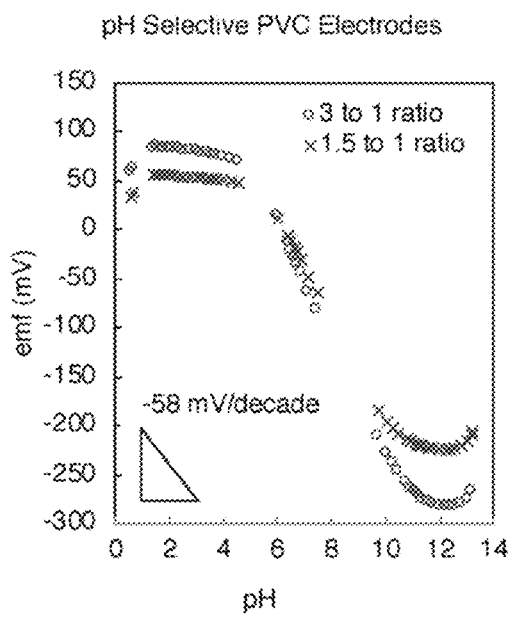
FIG. 1 is a graphical view of pH response of PVC-phase pH-selective electrodes with two different ionophore-to-ionic site ratios (3 to 1 and 1.5 to 1).

This disclosure addresses the problem of glass electrodes by introducing a crosslinked methacrylate polymeric membrane to replace the glass membrane of conventional pH electrodes and use a high surface area carbon material as solid contact to eliminate inner filling solutions. Crosslinked methacrylate membranes are mechanically robust, do not contain lead, and through the incorporation of a proton-selective ionophore can be fine-tuned for the desired pH working range. Replacing an inner filling solution with carbon solid-contact materials reduces the size of electrodes, enables miniaturization, and eliminates the need for maintenance of the inner filling solution.

To avoid a plasticizer, the polymer itself needs to be "self-plasticized". In terms of polymeric membranes for ISEs, the polymers need to have a glass transition temperature (Tg) below the temperature of intended use so that the membranes have a "rubber-like" nature so that sensing components such as an ionophore, ionic sites or target ions can diffuse freely within them. A common standard is a Tg below room temperature for most routine measurements. Unique application areas can require the Tg to be below −10° C., such as for certain industrial process control uses, or to be just below body temperature (37° C.) for implantable sensors.

Common plasticizer-free polymers suitable for ISEs fall into three major categories: polyurethane, silicone, and poly(methacrylate)- and poly(acrylate)-based polymers. Poly(methacrylate)- and poly(acrylate)-based polymers have the distinct advantages that the Tg of these polymers can be adjusted by carefully varying the ratio of the monomer(s) of the alkyl methacrylate or alkyl acrylate.

In view of developing sensors capable of long-term use and monitoring, it is beneficial to covalently attach critical sensor components to the membrane backbone to avoid the gradual loss of these components by leaching into samples. Methacrylate and acrylate polymerization chemistry opens the opportunity of covalently attaching components such as ionophores, ionic sites, ionic liquids, and salts to the backbone of the membrane polymer. Based on a well-known theoretical model, when freely dissolved in a membrane, pH ionophores such as tridodecylamine, 4-nonadecylpyridine (ETH 1907), or octadecyl isonicotinate (ETH1778) will leach out over 180 days into serum samples to an extent of 100%, 6.5%, and 92.3%, respectively.

For certain applications, covalent attachment of sensor components is also attractive for ISEs used at higher temperatures. However, past work on covalently attaching sensor components is limited, with only a few studies covalently attaching $K^+$ or $Na^+$ ionophores or tetraphenylborate based ionic site to a polymer backbone.

Herein, a methacrylate-based alkyl sulfonate as a covalently attached ionic site for crosslinked poly(methacrylate) membranes is described. The methacrylate unit ensures a precise reactivity match to the methacrylate monomer and methacrylate crosslinker for optimal covalently attachment.

To the best of our knowledge, this is the first time a methacrylate-based alkyl sulfonate is used as a covalently attached ionic site.

In addition, two types of methacrylate-based amines were used for the first time as covalently attached ionophores and provided Nernstian responses comparable to conventional ISE membranes with the free pH ionophore tridodecylamine.

Both the ionophore and ionic sites may be covalently attached to the membrane polymer. The concept of poly(methacrylate)-based solid-state ISEs can also be easily expanded to measurements other than pH, with a change of the pH ionophore for appropriate ionophores for other ions.

EXAMPLES

Materials

Potassium tetrakis(4-chlorophenyl)borate (KpClPB), decyl methacrylate (DMA), lauryl methacrylate (LMA), methyl methacrylate (MMA), 2,2'-azobis(2-methylpropionitrile) (AIBN), 2,2-dimethoxy-2-phenylacetophenone (DMPP), hexanediol dimethacrylate, 2-(dimethylamino)ethyl methacrylate, 2-(diisopropylamino)ethyl methacrylate, and 3-sulfonylpropyl methacrylate potassium salt were purchased from Sigma Aldrich (St. Louis, Mo.).

Tridodecylamine (TDDA) was purchased from Sigma (St. Louis, Mo.).

High molecular weight PVC and o-nitrophenyl octyl ether (o-NPOE) were purchased from Fluka (Buchs, Switzerland).

Nanographite powder (GS-4827, BET surface area of 250 m2/g, particle size distribution from 0.10 μm to 10 μm) and fine extruded graphite rod (0.25-inch outer diameter) were purchased from graphitestore.com (Northbrook, Ill.).

Fullerene powder (mixed, typically 98% C60 and 2% C70) and potassium tetrakis(pentafluorophenyl)borate were purchased from Alfa Aesar (Tewksbury, Mass.).

Anhydrous ethyl acetate was further dried over activated 4 Å molecular sieves overnight prior to use.

Anhydrous inhibitor-free THF was passed through a column of basic alumina to remove traces of peroxide.

Colloid-imprinted mesoporous (CIM) carbon was prepared as previously reported.

All aqueous solutions were prepared with deionized and charcoal-treated water (0.182 MΩ cm specific resistance) using a Milli-Q Plus reagent-grade water system (Millipore, Bedford, Mass.).

Purification of pH Ionophore Tridodecylamine

To purify tridodecylamine, 1 g of tridodecylamine was dissolved in 15 mL diethyl ether and washed with 1 mM aqueous potassium hydroxide solution (15 mL×3) and then with water (10 mL). Then the organic phase was collected and dried with magnesium sulfate.

After removal of the magnesium sulfate by filtration, the organic solvent was removed under vacuum. 1H NMR spectroscopy, MS, and elemental analysis showed that the thus purified and the unpurified tridodecylamine were within error identical. 1H NMR (CDCl$_3$, d): 2.33 (t, 6H, N—CH$_2$—(CH$_2$)10-CH$_3$), 1.25-1.39 (m, 60H, NCH$_2$—(CH$_2$)10-CH$_3$), 0.87 (m, 9H, N—CH$_2$—(CH$_2$)10-CH$_3$). ESI-MS: [Tridodecylamine-H]$^+$=521.7; [Didodecylamine-H]$^+$=354.5. Elemental Analysis (Atlantic Microlab, Norcross, Ga.): Found: 83.04% C, 14.42% H, 2.48% N, (Theoretical: 82.83% C, 14.48% H, 2.68% N).

PVC Membrane Preparation

Solutions to prepare pH-selective PVC membranes were prepared by slowly adding 66 mg PVC into a stirred solution of 132 mg o-NPOE and 1 mL THF, followed by addition of 39 mmol/kg tridodecylamine and potassium tetrakis(4-chlorophenyl)borate to give an ionophore-to-ionic site ratio of 3 to 1 or 1.5 to 1 (giving 13 or 26 mmol/kg mmol/kg as the final concentration in the ISE membrane, respectively). Solutions were stirred until the PVC had completely dissolved and then poured into a glass Petri dish of 25 mm diameter and left to dry over 24 h to give a plasticized PVC master membrane. Smaller circular disks of 7 mm were cut from master membranes and glued onto a Tygon tube with THF.

Synthesis of Poly(MMA-co-LMA) Copolymer and Membrane Preparation Removal of Inhibitor in Monomers To remove the inhibitor 4-methoxyphenol, 5 mL MMA or DMA was washed with aqueous solutions containing 5% (w/v) NaOH and 20% (w/v) NaCl three times (15 mL×3), then with water until the pH of resulting aqueous phase was neutral. The organic liquids were collected, dried over sodium sulfate, and the drying agent was removed by filtration prior to use.

Synthesis of Poly(MMA-Co-LMA) Copolymers

The synthesis method was adapted from a previously reported procedure. 1.06 g MMA and 3.94 g LMA (Type I, 25 wt % MMA and 75 wt % LMA) or 1.50 g MMA and 1.50 g LMA (Type II, 50 wt % MMA and 50 wt % LMA) were dissolved in 3 mL anhydrous ethyl acetate and added to a two-neck round bottom flask and purged three times with argon. Then 1 mL anhydrous ethyl acetate solution of 10.54 mg AIBN was added with a syringe. To ensure the correct ratio of MMA and LMA, sealing of the reaction flask is critical given the low vapor pressure of MMA. After the reaction was refluxed under argon for 18 h, solvent evaporation yielded a light-yellow viscous liquid which was then re-dissolved in 20 mL dioxane. Then the dioxane solution was added dropwise through a dropping funnel to a beaker of 800 mL vigorously stirred DI water, resulting in the formation of a very sticky white precipitate. The water phase was discarded, and the white precipitate was re-dissolved in 100 mL dichloromethane and dried over sodium sulfate. Removal of the drying agent by filtration and evaporation of the solvent gave 2.03 g of the final product (yield: 40.6%).

Membrane Preparation

Cocktail solutions for pH-selective poly(MMA-co-LMA) membranes were prepared by adding 13.34 mg TDDA and 3.59 mg KTpClPB (giving a 3 to 1 ratio of ionophore to ionic site) to a 6 mL stirred THF solution of 1.041 g copolymer. For electrodes with a conventional setup with an inner filling solution, an amount of cocktail solution with copolymer equivalent to 200 mg was then added into a Teflon Petri dish of 25 mm diameter and left to dry overnight to give a master membrane. Smaller circular disks of 19 mm were cut from these master membranes and mounted in custom-made electrode bodies. An aqueous solution containing 10 mM NaCl, 10 mM Na$_2$HPO$_4$, and 10 mM NaH$_2$PO$_4$ solution (pH=7.4) was used as inner filling solution. Prior to use, the electrodes were conditioned overnight in solutions with the same composition as the inner filling solution. For electrodes in solid contact setup, gold electrodes (planar circular Au electrodes with a 2 mm diameter, embedded into an inert Kel-F polymer shaft; CH Instruments, Austin, Tex.) were polished on a polishing cloth, first with 0.5 μm and then with 0.03 μm aqueous aluminum oxide slurry (Buehler, Lake Bluff, Ill.), and then sonicated first in water and then in ethanol, each for 6 min. A stream of argon was used to dry the electrodes. A CIM carbon suspension solution was prepared by dissolving 50 mg CIM carbon in 1.0 mL THF. Then, 30 μL of this suspension was dropcast onto the gold electrode and left to dry. This was followed by two aliquots (20 μL followed by 30 μL) of copolymer membrane solution dropcast onto the CIM carbon layer. After letting the solvent evaporate overnight, the electrodes were conditioned in 10 mM NaCl, 10 mM Na$_2$HPO$_4$ and 10 mM NaH$_2$PO$_4$ solution (pH=7.4) prior to use.

Synthesis of Crosslinked Poly(Decyl Methacrylate) and Membrane Preparation

To remove the inhibitor hydroquinone, DMA and hexanediol dimethacrylate were passed through a column of basic alumina. For blank polymer membranes without added sensor components, a total of 600 mg polymer matrix was prepared. 1.5 wt % photoinitiator DMPP was weighted in a vial. Then crosslinker hexanediol dimethacrylate of 2, 3, and 5 wt % and monomer decyl methacrylate of 96.5, 95.5, and 94.5 wt %, respectively, were converted to volume and added to DMPP via micropipette. The solution was stirred to completely dissolve the initiator. For membranes with free ionic sites, 13 mmol/kg potassium tetrakis(pentafluorophenyl)borate and either 40 mmol/kg tridodecylamine, 2-(dimethylamino)ethyl methacrylate, or 2-(diisopropylamino) ethyl methacrylate were added to the membrane matrix mixture.

For conventional self-standing membranes, solutions of membranes were placed in between two UV transparent quartz glass separated by a pair of Feeler gauges of 0.25 mm thickness. A sealed box was purged with argon for 10 min. With the argon flow continuing, a UV lamp with peak output at 365 nm was used for 20 min (too short or too long may result incomplete polarization or carbonization of membrane) to yield a crosslinked polymethacrylate membrane by polymerization. Smaller circular disks of 19 mm were cut from master membranes and mounted into custom-made electrode bodies. An aqueous solution containing 10 mM NaCl, 10 mM Na$_2$HPO$_4$ and 10 mM NaH$_2$PO$_4$ solution (pH=7.4) was used as inner filling solution. Prior to use, the electrodes were conditioned overnight in solutions with the same composition as the inner filling solutions.

For electrodes with nanographite or fullerene as solid contact, gold electrodes were cleaned and prepared in the same fashion as described previously herein. A carbon suspension solution of either nanographite or fullerene was prepared by dissolving 50 mg carbon in 1.0 mL THF, followed by sonication for 30 min. Then, 2 μL of this suspension was dropcast with a microsyringe to form a disk that was large enough to cover the gold surface entirely but smaller than necessary to fully cover the inert Kel-F enclosing the gold electrode. This was followed by carefully adding 5 μL membrane solution using a microsyringe from the edge of the electrode surface to allow gradual flow of the membrane solution onto the previously deposited carbon layer. This way the carbon layer was not disturbed by the addition of polymer solution. For electrodes with the solid contact setup comprising a graphite rod, graphite rods were polished with sandpaper to give a smooth surface. Two aliquots (5 μL followed by 30 μL) of polymer membrane solution were dropcast onto the rod surface.

After the addition of membrane solutions, the electrodes were placed into a well-sealed box covered by a UV transparent quartz glass plate. The box was purged with argon for 10 min, then with the same argon flow continuing, membranes were polymerized under UV irradiation (peak output: 365 nm) for 20 min. The oxygen-free environment provided by the sealed box and the argon flow was found to be critical. Without a well-sealed setup and the argon flow, partial or complete lack of polymerization was observed.

In the case of electrodes with a graphite rod as solid contact, an external custom-made electrode body case was used to carefully and fully enclose the carbon rod, and a copper wire was used to connect the carbon rod to the potentiostat. Caution should be used to cause as little rotating motion as possible when assembling the electrode body. No unnecessarily excessive mechanical pressure should be used so that the edge of the electrode body interfacing the sensing membrane does not cut or damage the poly(methacrylate) membrane. All electrodes were conditioned in 10 mM NaCl, 10 mM $Na_2HPO_4$ and 10 mM $NaH_2PO_4$ solution (pH=7.4) prior to use.

Synthesis of the Covalently Attachable Ionic Site 3-Sulfonylpropyl Methacrylate Tridodecylammonium Salt 512.12 mg 3-sulfonylpropyl methacrylate potassium salt (4 eq) was dissolved in 7 mL aqueous 1 M HCl solution, and 271.80 mg TDDA (1 eq) was dissolved in 33 mL diethyl ether. The two solutions were carefully equilibrated with one another in a separatory funnel. The ether phase was then collected and dried over magnesium sulfate. Removal of the drying agent and evaporation of the solvent yielded the final product (367.97 mg total, 75 mol % 3-sulfonylpropyl methacrylate tridodecylammonium salt and 25 mol % TDDA).

Synthesis of 3-Sulfonylpropyl Methacrylate N-Isopropyl-N-(2-(Methacryloyloxy)-ethyl)propan-2-ammonium Salt Five gram strongly acidic cation-exchanger resin was packed in a column and washed with 150 mL 1 M HCl. Then the resin was washed with DI water until the pH was neutral. 0.30 g 3-sulfonylpropyl methacrylate potassium salt (1 eq) was dissolved in a small amount of water and added to the column. Acidic fractions from the column were collected and 0.26 g 2-(diisopropylamino)ethyl methacrylate was added to the aqueous solution. The solution was allowed to freeze in a freezer at −80° C. over a period of 2 h before it was placed in a high vacuum freeze-dryer (0.124 mbar) for one day. Removal of water yielded a viscous colorless liquid as final product Potentiometry Potentiometric measurements were performed in stirred solutions with a 16-channel potentiometer (Lawson Labs, Malvern, Pa.) and a free-flowing free-diffusion double-junction reference electrode (DX200, Mettler Toledo, Switzerland; Ag/AgCl as internal reference, AgCl-saturated 3.0 M KCl as inner solution, and 1.0 M LiOAc as bridge electrolyte). The pH of sample solutions was changed stepwise by adding small aliquots of concentrated NaOH or HCl solutions. A half-cell pH glass electrode (InLab 201, Mettler Toledo, Columbus, Ohio; calibrated with standard NIST pH buffers of pH 4.0, 7.0, 10.0, and 12.0) was used to monitor separately the pH. Selectivity coefficients were determined for $Na^+$ with the fixed interference method (FIM). Nernstian slopes were confirmed in all cases. All response times in the Nernstian response region were fast (<5 s). Activities were calculated with a two-parameter Debye-Hückel approximation.

Results and Discussion

Optimal Ratio of Ionophore and Ionic Site

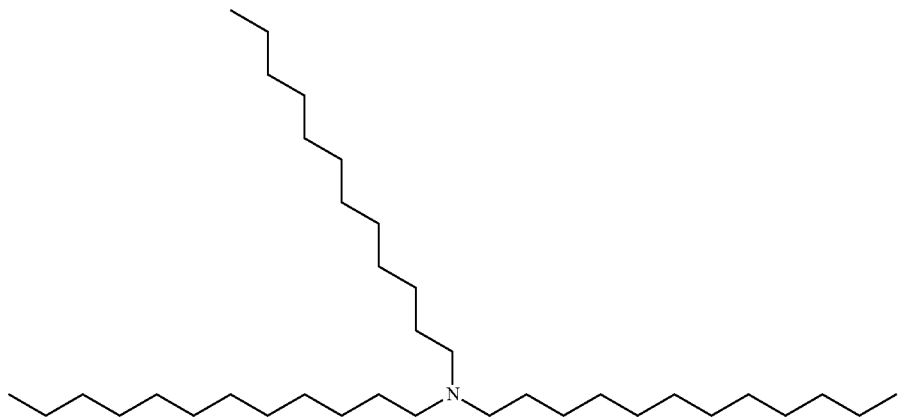 [SMILES: CCCCCCCCCCCCN(CCCCCCCCCCCC)CCCCCCCCCCCC]

Tridodecylamine is a well-known pH ionophore that is commercially available as Hydrogen Ionophore I. Its large hydrophobicity affords it the tendency to remain in organic membrane phases, providing it a good resistance to the gradual loss of ionophore into sample solutions.

Plasticized PVC membranes made with two different ionophore-to-ionic site ratios—namely, 3 to 1 and 1.5 to 1—were investigated to establish the optimal ratio (see FIG. 1). ISE membranes with a 3 to 1 ratio resulted in higher and closer-to-theoretical Nernstian response slopes (−57.7±0.5 mV/decade, n=7) compared to membranes with a 1.5 to 1 ratio (−51.6±1.1 mV/decade, n=7). Membranes with the 3 to 1 ionophore-to-ionic site ratio are also more selective with respect to interfering Na$^+$, with a potentiometric selectivity coefficient (log $K_{H,Na}^{pot}$) of −10.0±0.7 (n=3), which is two orders of magnitude higher than that of ISE membranes with a 1.5 to 1 ionophore-to-ionic site ratio (log $K_{H,Na}^{pot}$: −7.7±0.1, n=6).

Referring to FIG. 1, EMF measurements were started at pH 7.4 (10 mM NaCl, 10 mM Na$_2$HPO$_4$ and 10 mM NaH$_2$PO$_4$ solution). The pH was increased by adding small aliquots of 6 M NaOH solution. Subsequently, starting again at pH 7.4, the pH was decreased by adding aliquots of 1 M HCl solution. Linear range: pH 4.1 to 12.0. Slope: −57.7±0.5 mV/decade for the 3 to 1 ionophore-to-ionic site ratio (n=7) and −51.6±1.1 mV/decade for the 1.5 to 1 ionophore-to-ionic site ratio (n=7).

The higher slope and better selectivity in ISE membranes with the 3 to 1 ionophore-to-ionic site ratio strongly suggests that contrary to the conventionally assumed 1:1 binding ratio between common pH ionophores and H$^+$ as primary ion, the ionophore tridodecylamine studied here and H$^+$ form concurrently also a 2:1 complex in addition to the 1:1 complex. This can explain the under-performance of membranes with the 1.5 to 1 ionophore-to-ionic ratio, in which due to the formation of 2:1 ionophore-H$^+$ complexes, there is not enough free ionophore. Free ionophore not bound to the primary ion is a prerequisite for high potentiometric selectivity. Low polarity fluorous-phase ISEs were also shown to exhibit superior performance when prepared with a 4 to 1 ionophore-to-ionic-site ratio. It appears likely that 2:1 complexes can also be formed between H$^+$ and other trialkylamine ionophores.

ISEs with Poly(MMA-co-LMA) Copolymers Membrane

Figure 2:
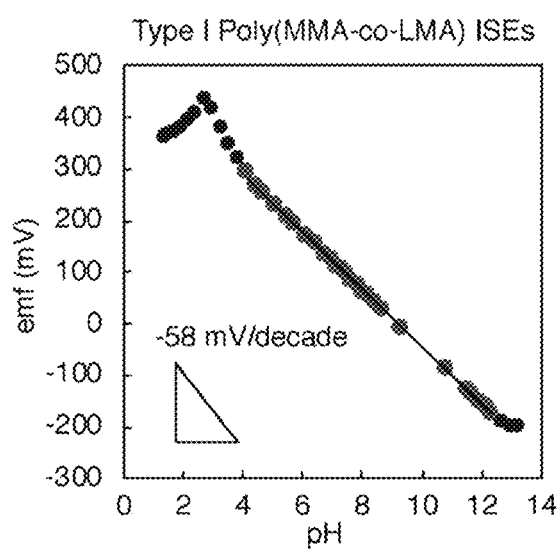
FIG. 2 is a graphical view of pH response of a solid-contact Type I poly(MMA-co-LMA) copolymer membrane. EMF measurements were started at pH 7.4 (10 mM NaCl, 10 mM $Na_2HPO_4$ and 10 mM $NaH_2PO_4$ solution).
Figure 3:
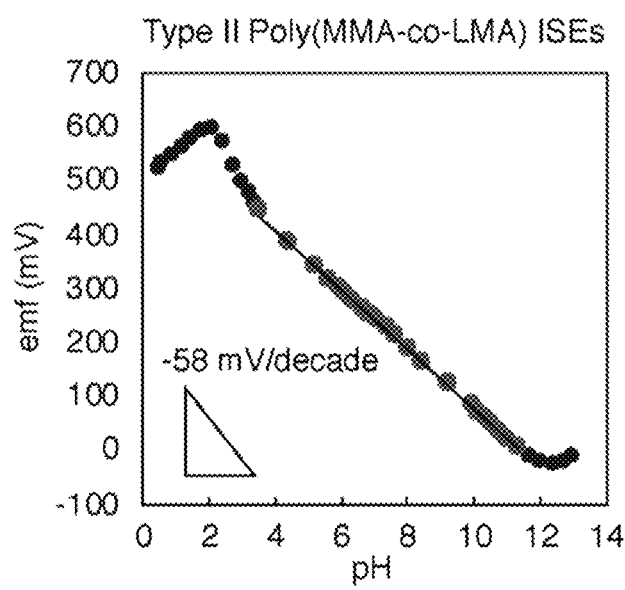
FIG. 3 is a graphical view of pH response of a Type II poly(MMA-co-LMA) copolymer membrane mounted in a conventional electrode body with inner filling solution (10 mM NaCl, 10 mM $Na_2HPO_4$ and 10 mM $NaH_2PO_4$ solution).

Two types of pH selective poly(MMA-co-LMA) copolymer membranes were prepared with the synthesis scheme shown in FIG. 2. Sealing of the reaction system against ambient air is critical to ensure the desired ratio of monomers given the low vapor pressure of and the potential loss of MMA during the course of the reflux reaction. Type I copolymer, which has 25 wt % MMA and 75 wt % LMA with a Fox-equation-calculated glass transition temperature of −35° C., did not give self-standing membranes. The copolymer at this ratio turned out to be soft, hard to peel off even from the Teflon substrate, and when in contact with water, it swelled easily and turned gel like. Type II copolymer prepared from 50 wt % MMA and 50 wt % LMA with a Fox-equation calculated glass transition temperature of −5° C. is self-supporting (see FIG. 3). Since Type I membranes are not self-supporting, solid-contact electrodes with a carbon interlayer were fabricated to characterize their pH response. Type II membranes were tested with a conventional setup with an inner filling solution. Response curves of Type I and Type II membranes to pH are shown in FIGS. 2 and 3, respectively. Electrodes made with both types of poly(MMAco-LMA) membranes gave within error the same linear range (pH 4.1 to 12.4) and slopes (Type I: 54.8±1.1; Type II: 53.8±1.8; mV/decade) of the pH response as well as selectivity against Na$^+$ (selectivity coefficient log $K_{H,Na}^{pot}$=−=10.9). The linear range, slope, and selectivity of pH selective poly(MMA-co-LMA)-based ISEs are also the same as for PVC based ISEs with the same ionophore-to-ionic site ratio. It can be safely concluded that the change of membrane matrix from plasticized PVC phase to poly (MMA-co-LMA) had only a minimal impact on the ISE response to pH. This demonstrates that copolymers with MMA/LMA ratios ranging from 25/75 wt % to 50/50 wt % have a very similar membrane polarity to PVC plasticized with o-NPOE and that poly(MMA-co-LMA) is a suitable membrane matrix option for developing plasticizer-free pH ISEs.

Illustrated below is the formation of poly(MMA-co-LMA) by copolymerization

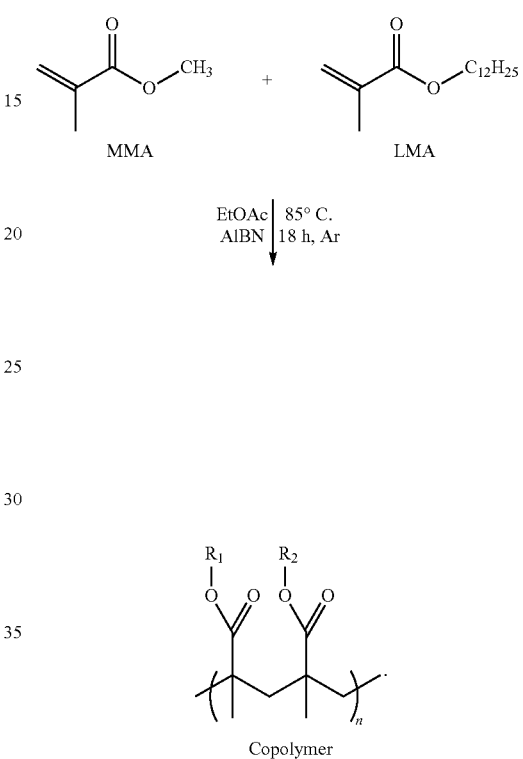

As illustrated in FIG. 2, the pH was increased by adding small aliquots of 6 M NaOH solution. Subsequently, starting again at pH 7.4, the pH was decreased by adding aliquots of 1 M HCl solution. Linear range: pH 4.1 to 12.4 (slope: 54.8±1.1 mV/decade; n=5).

As illustrated in FIG. 3, EMF measurements were started at pH 7.4 (10 mM NaCl, 10 mM Na$_2$HPO$_4$ and 10 mM NaH$_2$PO$_4$ solution) solution. The pH was increased by adding small aliquots of 6 M NaOH solution. Subsequently, starting again at pH 7.4, the pH was decreased by adding aliquots of 1 M HCl solution. Linear range: pH 4.1 to 12.4 (Slope: 53.8±1.8 mV/decade; n=3).

UV-polymerized Crosslinked Poly(Decyl Methacrylate) Membranes

In view of developing plasticizer-free poly(methacrylate)-based membranes that can be prepared faster and in a more straightforward manner, UV polymerization was examined.

With appropriate photoinitiators, UV polymerization can produce membranes suitable for use in ISEs within a few minutes, as compared to the much longer time (>18 h) needed for thermal polymerization. This also is beneficial when ISEs with membranes comprise ionophores, ionic sites, ionic liquids, or salts that are unstable at higher temperature. The use of crosslinked membranes also opens the opportunity for covalently attaching sensor components that have a similar functional unit as the monomers used to prepare the membrane matrix-ideally methacrylate units for precise matching of reactivity. Chemical bonding of sensor components such as ionophores and ionic sites can prevent leaching of these components into samples. This is especially important for the development of sensors for long-term use and in special applications that involve high temperatures or high pressures.

Figure 4:
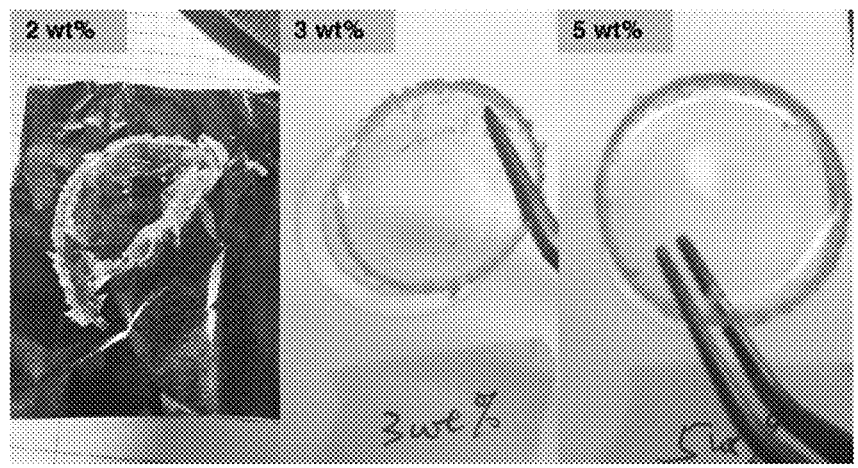
FIG. 4 is a pictorial view showing the physical appearance of poly(decyl methacrylate) membranes with different weight percentages of crosslinker.

This section describes the development of blank membranes without any sensor components from decyl methacrylate monomers by UV-polymerization with different weight percentages of bifunctional crosslinker hexanediol dimethacrylate to investigate the effect of different concentrations of crosslinker on the physical properties of the membrane matrix. The reaction scheme shown below, and a comparison of the physical appearances of the resulting membranes is presented in FIG. 4. With a 2 wt % crosslinking level, membranes are soft, sticky, and very hard to remove from the underlying substrate. With a 3 wt % crosslinking level, the membranes are less sticky and easier to remove from the substrate. With a 5 wt % crosslinking level, membranes are not sticky and are very easy to be remove from the underlying substrate. The substrate tested here was glass. Teflon would be an ideal substrate; however, Teflon is soft and typically not perfectly flat, leading to either unsealed conditioned and incomplete polymerization. In the case where the entire Teflon substrate is placed in a well-sealed box, liquid membrane solutions may leach out from underneath the Teflon ring that makes up a dish unless very thick membranes are used. For crosslinked poly(methacrylates) that are intended for long-term use, it is important to understand their physical properties and any change induced by exposure to water.

ISEs with Crosslinked Poly(Decyl Methacrylate) Membranes

Reaction Scheme for the Preparation of Crosslinked Poly (Decyl Methacrylate) Membranes

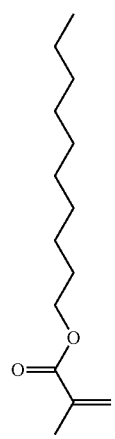

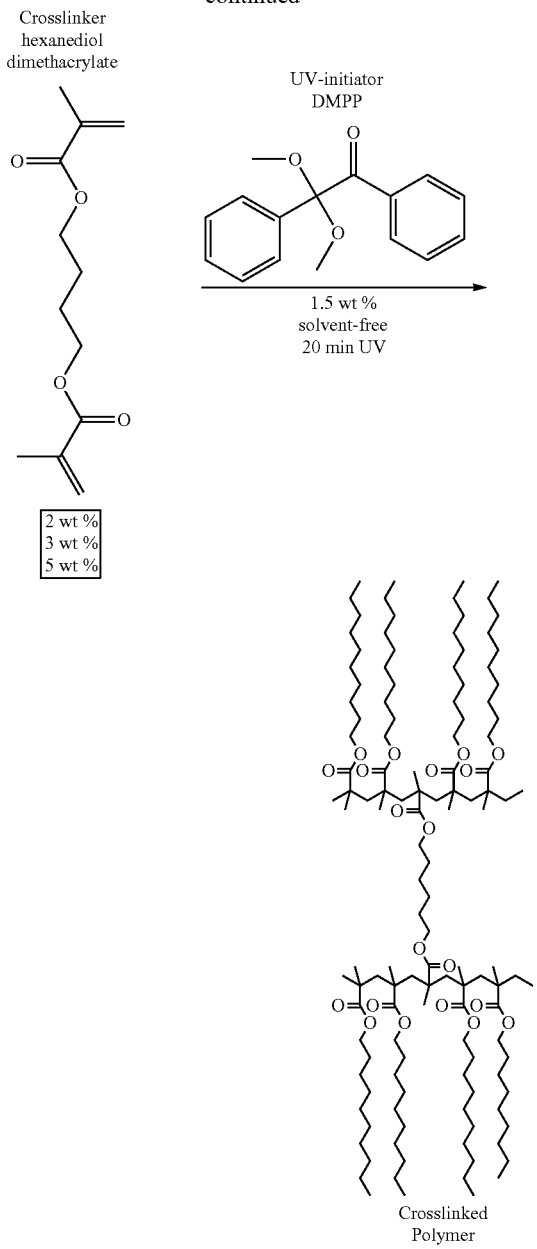

Figure 5:
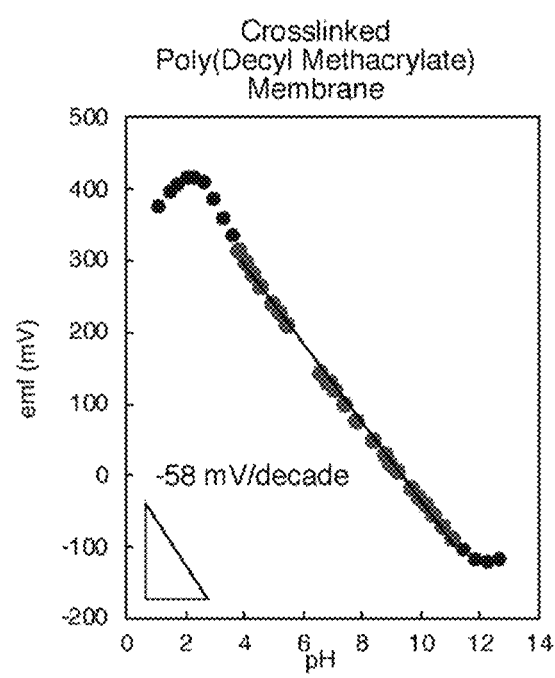
FIG. 5 is a graphical view of pH response of crosslinked poly(decyl methacrylate) copolymer membranes mounted in conventional ISE bodies with an inner filling solution (10 mM NaCl, 10 mM $Na_2HPO_4$ and 10 mM $NaH_2PO_4$ solution).

Three identical electrodes with pH-selective crosslinked poly(decyl methacrylate) membranes and a 3 to 1 ionophore-to-ionic site ratio were tested for their pH response. Two of the electrodes gradually developed pinholes in the membrane during conditioning and, therefore, failed due to the leaking of inner filling solution and formation of an open circuit. The remaining electrode gave within errors the same linear range (pH 4.1 to 12.4) and slope (54.9 mV/decade) pot in pH response as well as selectivity against Na+(selectivity coefficient log $K_{H,Na}^{pot}$=−10.9; FIG. 5) as pH selective ISEs based on poly(MMA-co-LMA) and the PVC-based ISE membranes doped with the same ionophore to ionic site ratio. We conclude here that these three membrane matrixes-plasticized PVC, poly(MMA-co-LMA), and crosslinked poly(decyl methacrylate)—have a similar matrix polarity. This also demonstrates that crosslinked poly(decyl methacrylate) is a suitable membrane matrix for developing plasticizer-free pH ISEs, with the advantages of fast UV-polymerization and a methacrylate chemistry that permits the covalent attachment of sensors components such as ionophore, ionic site, ionic liquid, or salt to the polymer backbone.

EMF measurements were started at pH 7.4 (10 mM NaCl, 10 mM Na$_2$HPO$_4$ and 10 mM NaH$_2$PO$_4$ solution) solution. The pH was increased by adding small aliquots of 6 M NaOH solution. Subsequently, starting again at pH 7.4, the pH was decreased by adding aliquots of 1 M HCl solution. Linear range: pH 4.1 to 12.4 (slope: 54.9 mV/decade; n=1).

Effect of Heat Exposure on ISEs with Crosslinked Methacrylate Membranes

Figure 6:
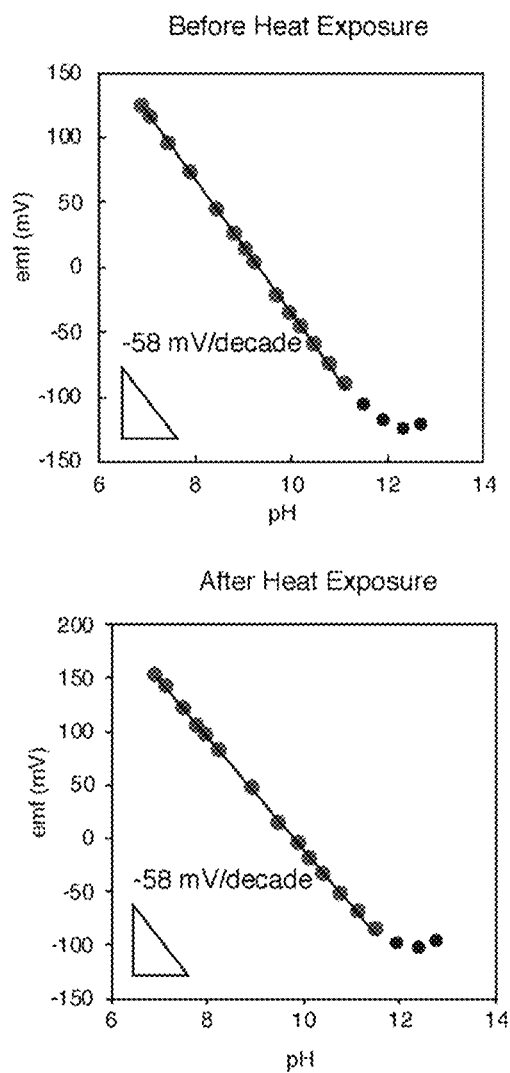
FIG. 6 includes two graphical views of pH responses of a crosslinked poly(decyl methacrylate) copolymer membrane in a conventional electrode setup with an inner filling solution (10 mM NaCl, 10 mM $Na_2HPO_4$ and 10 mM $NaH_2PO_4$ solution).
Figure 7:
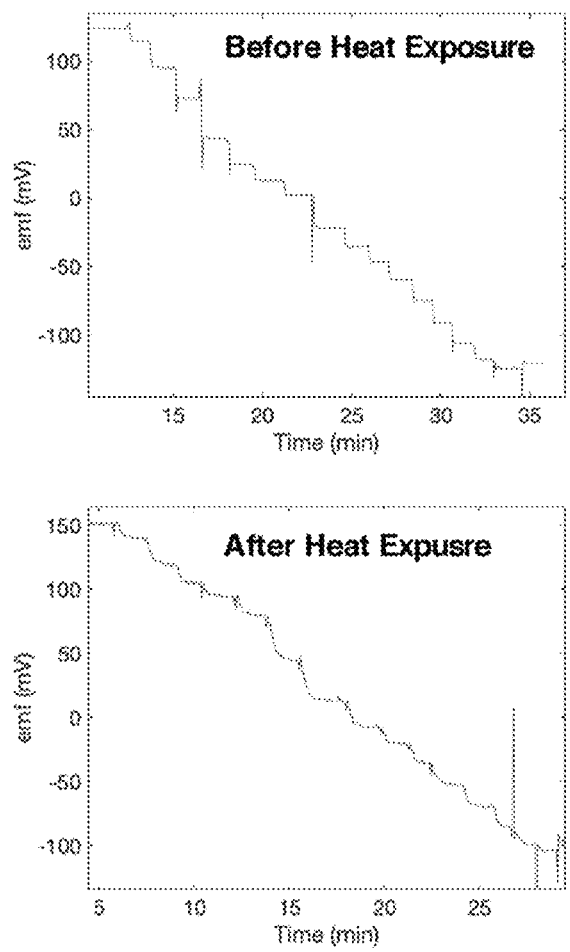
FIG. 7 includes two graphical views of time profiles of the pH response of a crosslinked poly(decyl methacrylate) copolymer membrane in a conventional electrode setup with an inner filling solution (10 mM NaCl, 10 mM $Na_2HPO_4$ and 10 mM $NaH_2PO_4$ solution).
Figure 11:
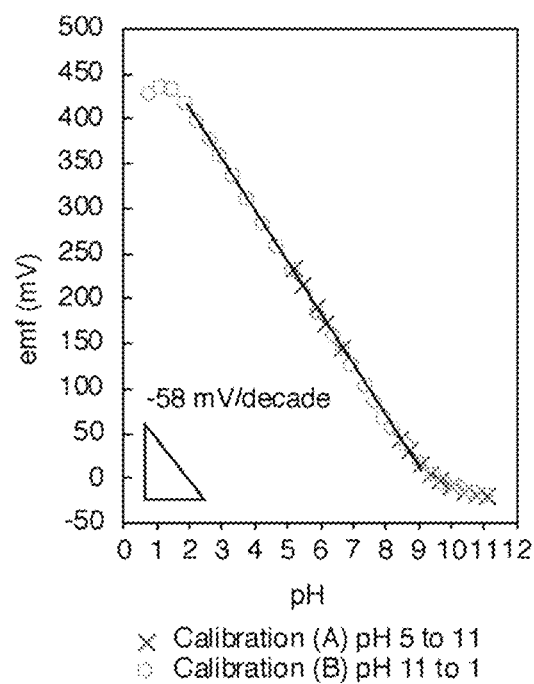
FIG. 11 is a graphical view of pH response and reversibility of crosslinked poly(decyl methacrylate) copolymer membranes in a solid contact ISE set up with a covalently attached ionophore.

The effect of heat exposure was investigated for crosslinked methacrylate membranes following the measurement of their pH response. The electrodes were placed in water at 90° C. for 30 min, followed by reconditioning for 1 h at room temperature and retesting of their pH response. A comparison of the pH response before and after heat exposure is shown in FIG. 6, and a comparison of their potential-time profile is shown in FIG. 7. The electrodes maintained their linear Nernstian responses, resistance, and selectivity against Na+ (before: slope: 51.3 mV/decade, resistance: 590 MΩ, and selectivity coefficient log $K_{H,Na}^{pot}$=−10.9; after: slope: 52.8 mV/decade, resistance: 450 MΩ, and selectivity coefficient log $K_{H,Na}^{pot}$=−10.9). This demonstrates the heat exposure at 90° C. does not compromise their excellent pH characteristics. However, the electrodes had an approximately one order of magnitude slower response (FIG. 11). The response time to reach 95% of the final response after a pH change (t95) increased from 5 s to 50 s after heat exposure. To understand and prevent this slower response, further investigation of membranes with increased crosslinking levels and covalently attached ionophore and ionic site is currently under way.

EMF measurements were started at pH 7.4 (10 mM NaCl, 10 mM Na$_2$HPO$_4$ and 10 mM NaH$_2$PO$_4$ solution) solution. The pH was increased by adding small aliquots of 6 M NaOH solution.

EMF measurements were started at pH 7.4 (10 mM NaCl, 10 mM Na$_2$HPO$_4$ and 10 mM NaH$_2$PO$_4$ solution). The pH was increased by adding small aliquots of 6 M NaOH solution.

Solid-Contact ISEs with Crosslinked Poly(Decyl Methacrylate) Membranes Containing Free Ionophore and Ionic Sites Optimization of the UV-Polymerization of Pencil-Shaped Solid-Contact Electrodes with Crosslinked Poly(Methacrylate) Membranes.

Methacrylate membranes on top of fullerene solid contacts failed to polymerize because the methacrylate cocktail remained liquid after UV irradiation. I suspect this is due to dissolution of the fullerene into the methacrylate solution, impeding UV polymerization by absorption of the UV light by the fullerene. In initial experiments, methacrylate membranes on top of nanographite solid contacts polymerized; however, the polymerization conditions also resulted in severe cracking and disruption of the carbon layer. Optimization of this process was performed by reduction of the size of the carbon disk so that it was only slightly larger than the gold surface but smaller than the Kel-F polymer surrounding the gold disk. Then methacrylate membranes were cast to cover the entire front face of the Kel-F body, thus enclosing the smaller carbon disk entirely. UV polymerization in this setup proved to be reliable and did not cause any cracking problems.

In addition, an improved well-sealed box for the polymerization with continuous argon purging during the polymerization also proved to be very critical. Without an argon atmosphere, a lower polymerization efficiency or even at times no polymerization was observed. With the new membrane/carbon layer structure and improved oxygen-free and water environment, UV polymerization of methacrylate membranes with nanographite carbon solid contacts is reliable. An electrode made with this procedure is shown in FIG. 11. With the improved setup and oxygen- and water-free conditions, membranes can be efficiently polymerized without any cracks in the carbon solid contact.

Figure 9:
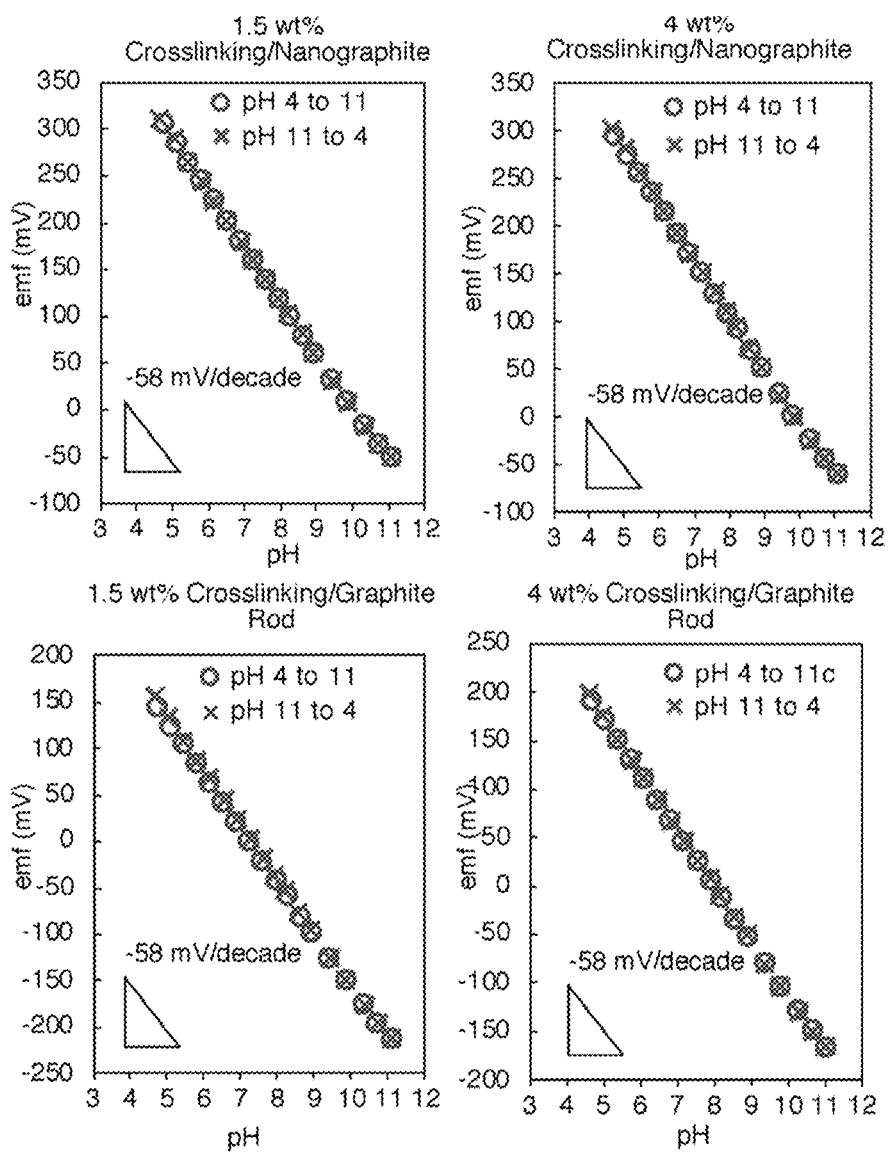
FIG. 9 includes graphical views of pH response and reversibility of crosslinked poly(decyl methacrylate) copolymer membranes in a solid-contact electrode set up. Top left: 1.5 wt % crosslinked poly(methacrylate) membranes with nanographite as solid contact. Top right: 4 wt % crosslinked poly(methacrylate) membranes with nanographite as solid contact. Bottom left: 1.5 wt % crosslinked poly(methacrylate) membranes with a graphite rod as solid contact. Bottom right: 4 wt % crosslinked poly(methacrylate) membranes with a graphite rod as solid contact.

ISE pH Response and Reversibility.

pH-selective crosslinked poly(methacrylate) membranes were tested for the response reversibility and the range of their linear (Nernstian) response (pH 4 to 11). Two types of crosslinked poly(methacrylate) membranes (1.5 wt % and 4 wt % crosslinker concentrations) and two types of solid contact materials (nanographite and graphite rods) were used in all possible combination, giving four different configurations. Three identical electrodes were made for each of these four configurations. Reversibility was assessed by comparing the slope and intercept of two subsequent calibrations for each electrode: first a response curve from pH 4 to pH 11, and then a response curve from pH 11 back to pH 4. The complete set of slope, intercept, and resistance values is shown in Table 1 with calibration curves of Electrodes 1, 6, 9, and 10 shown in FIG. 9 as representatives of each of the four configurations. EMF measurements were started at pH 4.7 (10 mM NaCl and 10 mM NaH$_2$PO$_4$ solution) solution. The pH was increased by adding small aliquots of 6 M NaOH solution. Subsequently the pH was lowered by adding small aliquots of 1 M HCl solution.

When nanographite was used as solid-contact, both 1.5 and 4 wt % crosslinked poly(methacrylate) membranes gave good Nernstian and reversible pH responses, with the 1.5 wt % crosslinked membranes having slightly better reversibility. When a graphite rod was used as solid contact, both 1.5 and 4 wt % crosslinked poly(methacrylate) membranes gave good Nernstian and reversible pH responses, with 4 wt % membranes having slightly better reversibility.

TABLE 1 pH Response and Reversibility of Solid-Contact ISEs with Crosslinked Poly(methacrylate) Membranes.

| | Membrane Cross-linking | | | | | | | | | |
|---|---|---|---|---|---|---|---|---|---|---|
| | 1.5 wt % | | | | | 4 wt % | | | | |
| | Slope/ mV/decade | | Intercept/ mV | | | | Slope/ mV/decade | | Intercept/ mV | |
| pH calibration No. | 4→11 | 11→4 | 4→11 | 11→4 | R/ MΩ | No. | 4→11 | 11→4 | 4→11 | 11→4 | R/ MΩ |
| | Individual electrode | | | | | | Individual electrode | | | |
| Nanographite solid contact | | | | | | | | | | |
| 1 | 57.3 | 57.2 | 574.1 | 573.7 | 30 | 4 | 57.0 | 57.8 | 546.6 | 557.1 | 35 |
| 2 | 57.3 | 57.2 | 577.9 | 578.0 | 17 | 5 | 56.9 | 58.0 | 551.4 | 564.7 | 34 |
| 3 | 57.2 | 58.2 | 551.8 | 563.2 | 38 | 6 | 56.9 | 57.2 | 561.9 | 565.4 | 11 |
| Graphite rod solid contact | | | | | | | | | | |
| 7 | 56.9 | 57.8 | 422.5 | 432.9 | 420 | 10 | 57.0 | 57.2 | 459.4 | 461.6 | 100-7 |
| 8 | 50.9 | 51.3 | 445.3 | 440.2 | 4 | 11 | 55.7 | 56.0 | 437.5 | 440.6 | 730 |
| 9 | 57.1 | 57.8 | 414.0 | 422.4 | 331 | 12 | 52.7 | 52.9 | 431.9 | 428.6 | 33 |

Water Leaking and Shorting of Graphite-Rod Solid-Contact Electrodes.

Figure 8:
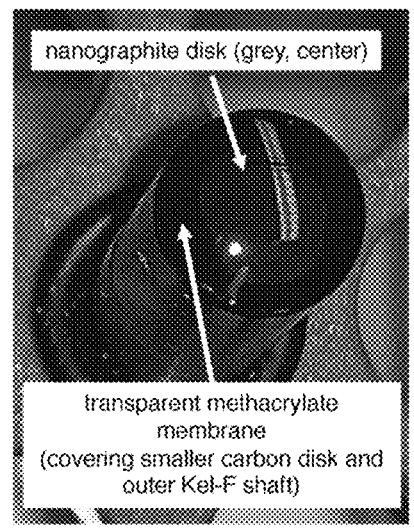
FIG. 8 is a pictorial view of a crosslinked polymethacrylate membrane UV-polymerized on top of nanographite carbon as solid-contact material.
Figure 10:
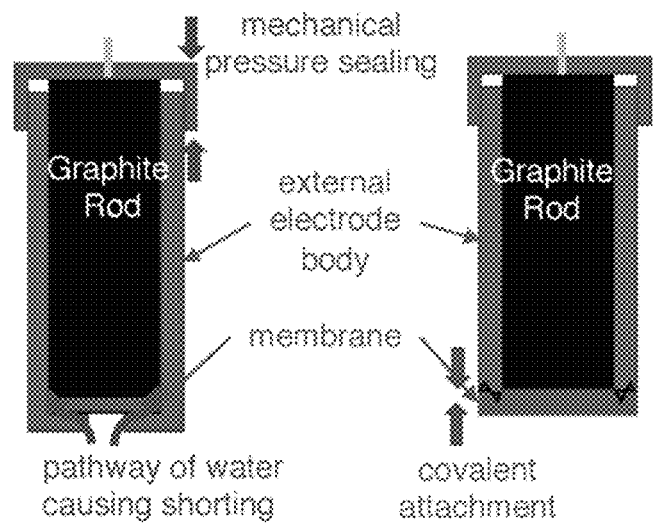
FIG. 10 is an illustration of a common electrode body design that can lead to water bypassing the sensing membrane and shorting problems (left), and a design with polymeric membranes covalently attached to the external electrode body, avoiding such shorting (right).

However, Electrodes 8 and 12, both with a graphite rod as solid contact enclosed within an external electrode body, exhibited a more than two orders or magnitude lower resistance. This is clear evidence of water entering the electrode body, resulting in shorting with the conductive carbon. This is a problem with the external electrode body design. An illustration of the electrode body design with a carbon shorting pathway is given in FIG. 10 (left). A fundamentally different way to avoid this problem is to covalently attach the sensing membranes to the external body as illustrated in FIG. 10 (right) and as shown in FIG. 8. The sensor of this disclosure is useful as a pH analyzer. The sensor may be disposed within or on a sensor body. The fluid may be flowing as in a continuous process or may be a fluid in a batch operation that is either stirred or quiescent.

Suitable materials for such as tube-shape electrode body include glycol-modified polyethylene terephthalate (PET-G) which through surface modification can yield functional methacrylate units that can allow attachment of poly(methacrylate)-based membranes to avoid any water shorting problems. This is a promising direction since for many applications where pencil shape electrodes are desirable, and where membrane delamination from substrate is a frequent problem.

ISEs with Crosslinked Poly(Decyl Methacrylate) Membranes and Covalently Attached Ionophore Poly(methacrylate) ISEs membranes with covalently attached ionophore were made by copolymerization with an amine with a methacrylate group, i.e., 2-(dimethylamino) ethyl methacrylate or 2-(diisopropylamino)ethyl methacrylate (see below for the reaction scheme).

Since this ionophore has exactly the same functional methacrylate unit as the monomer of the polymer matrix, it is covalently attached during polymerization to the matrix polymer backbone. This approach avoids loss of ionophore during exposure of the sensor to samples and is expected to result in improved sensor lifetimes as compared to ISEs membranes doped with an ionophore not covalently attached to the polymer matrix.

Reaction scheme for the preparation of crosslinked poly (methacrylate) membranes with a covalently attached pH ionophore.

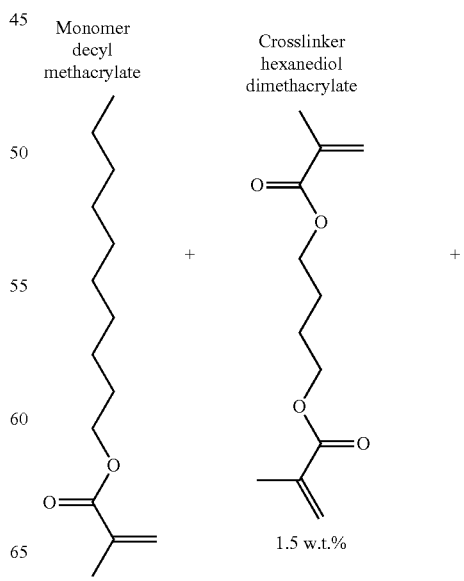

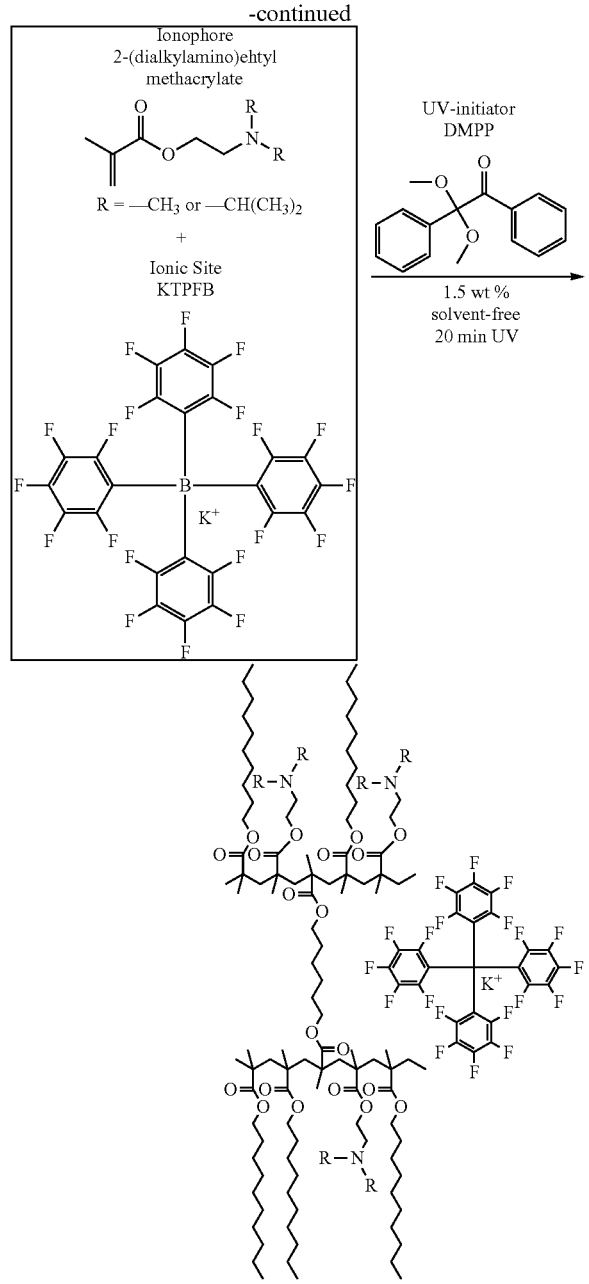

The calibration of electrodes with covalently attached ionophore gave Nernstian and reversible responses (FIG. 11). EMF measurements were started at pH 4.7 (10 mM NaCl and 10 mM $NaH_2PO_4$ solution) solution. The linear range, from pH 1.9 to pH 9.2, is approximately two pH units shifted to the acidic direction as compared to ISEs with membranes doped with free tridodecylamine as ionophore. This is expected based on a well-developed theory given that 2-(dimethylamino)ethyl methacrylate is a structurally less basic amine than tridodecylamine. The pKa value of 2-(dimethylamino)ethyl methacrylate and tridodecylamine are estimated to be 8.2 and 9.8, respectively. The difference between the pKa is 1.66 in logarithmic scale, very close to their working range shift of 2 pH units. The resistance was measured to be 300 MΩ, which is the same order of magnitude as for the same membrane matrix with the free ionophore tridodecylamine. This is not a surprise given that the ionic site is still the same and not covalently attached to the polymer backbone. Among six identical electrodes, three gave an average slope of 55.7±1.0 mV/decade while three others gave slopes below 50 mV/decade.

Follow-up experiments with a covalently attachable ionophore 2-(diisopropylamino)ethyl methacrylate have been made. With two isopropyl groups replacing the two methyl groups on the center nitrogen, the new ionophore is more basic (estimated pKa: 9.3) and gives a pH range closer to that of tridodecylamine.

The pH was increased by adding small aliquots of 6 M NaOH solution. Subsequently the pH was lowered by adding small aliquots of 1 M HCl solution. Average slope: 55.7±1.0 mV/decade (n=3).

ISEs with Crosslinked Poly(Decyl Methacrylate) Membranes and Covalently Attached Ionic Sites Covalently attachable ionic sites.

The most used free ionic site in ISEs is hydrophobic tetraphenylborate-based salt modified on all four of their aromatic rings with electron-withdrawing groups such as by 4-Cl, 2,3,4,5,6-pentafluoro, or 3,5-trifluoromethyl substitution to improve its chemical stability. Ionic sites for covalent attachment that have been reported in the literature previously are tetraphenylborate modified with a methcryloylmethyl unit, a triethoxysilylpropoxy unit, or an allyloxy unit and a sulfonated PVC polymer (sulfonate as ionic sites). However, the former is not commercially available and after one of its four phenyl rings was modified with covalently attachable unit, the rest of the three phenyl rings were left unmodified with any electron-withdrawing groups. The latter, as sulfonated PVC polymer, cannot be readily used with non-PVC polymeric membranes materials. Sodium styrene sulfonate, although having a carbon-carbon double bond, is not methacrylate, which results in a polymerization reactivity different from that of the membrane matrix. In the disclosure described herein, for the first time, an alkyl sulfonate with a methacrylate unit was used to match the reactivity in the polymerization precisely with that of the methacrylate matrix monomer. For pH measurements, one pre-requisite is that the ionic site has a pKa low enough that in all relevant applications, the ionic site remains dissociated from $H^+$ and negatively charged. The pKa values for the sulfonate salt used in this study has not been reported previously. For comparison, however, the pKa of benzenesulfonic acid and methanesulfonic acid in water are −2.85 and −1.95, respectively, both of which are sufficiently low for the vast majority of applications.

However, the only commercially available alkyl sulfonate with a methacrylate unit, the 3-sulfopropyl methacrylate potassium salt, is not sufficiently soluble in decyl methacrylate. To increase its solubility, the potassium ion was exchanged for the tridodecylammonium ion, the protonated form of the ionophore tridodecylamine by equilibration of an acidic aqueous solution with an ether solution of the ionophore in the presence of the sulfonate. Other (inert) hydrophobic cations such as tetraalkylammonium ions have been used to pair with ionic sites to increase the solubility of ionic site salt in monomer solutions used for the polymerization of ISE ion exchanger membranes. However, it is disadvantageous to use such inert ions because they need to be replaced by ion exchange with $H^+$ for membranes that are selective for pH ($H^+$). The use of protonated tridodecylamine as the cation eliminates the subsequent need for ion exchange and can, therefore, significantly simplify the conditioning of ISE membranes.

After equilibration of an acidic aqueous solution with an ether solution of tridodecylamine in the presence of the sulfonate, 1H-NMR spectra confirmed that the product contained 75 mol % 3-sulfopropyl methacrylate tridodecylammonium salt and 25 mol % excess of neutral tridodecylamine. The product is fully soluble in the decyl methacrylate monomer. The excess tridodecylamine was not removed since in ISE membranes ionophores are used in greater amount than ionic site (for example 3 to 1 ionophore-to-ionic site ratio used here) and had to be added anyway to the solution needed for the polymerization. The polymerization scheme for the preparation of membranes with covalently attached alkyl sulfonate ionic sites is shown below.

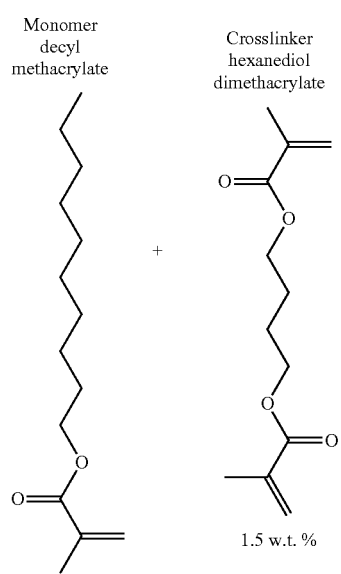

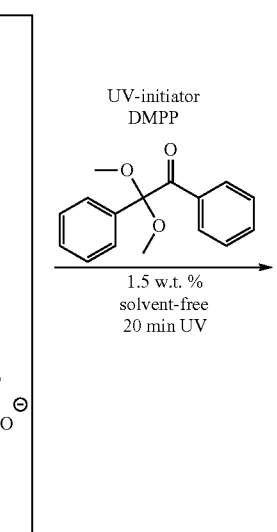

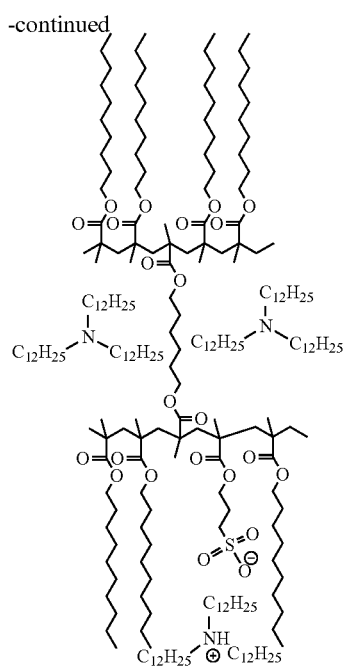

pH Response of Membranes with Covalently Attached Ionic Sites.

Figure 12:
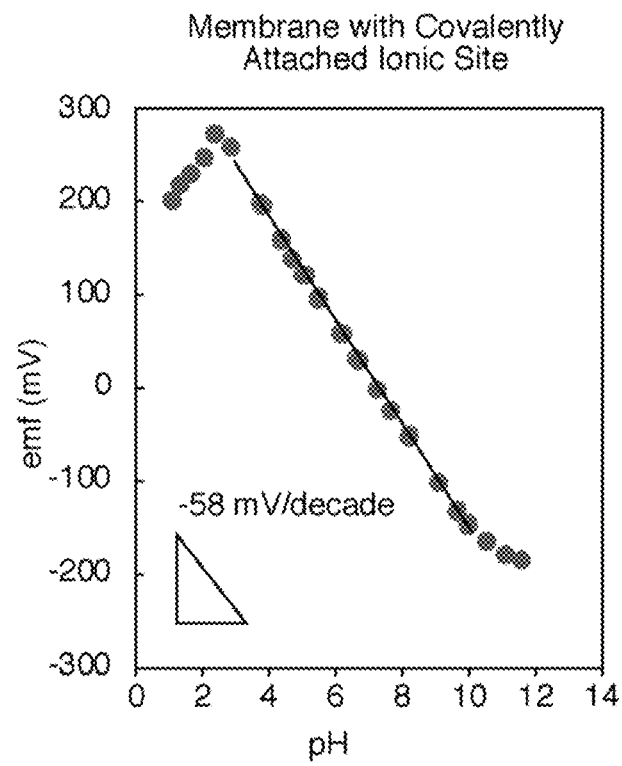
FIG. 12 is a graphical view of pH response of crosslinked poly(decyl methacrylate) copolymer membranes in a solid contact ISE set up with a covalently attached ionic site.

Calibration curves for ISEs with membranes that have covalently attached ionic sites and the (mobile) ionophore tridodecylamine show a similar linear range of the pH response as membranes with mobile ionic sites (pH 4 to 12) as shown in FIG. 12. EMF measurements were started at pH 12.0 (10 mM NaCl and 10 mM $NaH_2PO_4$ solution adjusted to pH 12). The pH was lowered by adding small aliquots of 1 M HCl solution. Average slope: 56.0 mV/decade (n=1).

Among six identical electrodes made, one electrode gave a very close to theoretical Nernstian response slope of 56.0 mV/decade, with 23 GΩ membrane resistance. Another three electrodes gave an average slope of 48.3±1.7 mV/decade (average resistance: 18 GΩ) and the other two electrodes did not give a satisfactory pH response. This demonstrates that ISEs with a covalently attached ionic site can give Nernstian responses but have an almost two orders of magnitude higher resistance than ISE membranes with free ionic site (with either free or covalently attached ionophore). These electrodes were made with 4 wt % ionic sites (corresponding to 54 mmol/kg concentration in membrane). However, a significantly higher ionic site weight percentage may decrease the hydrophobicity of the methacrylate matrix, thus impacting the pH response.

ISEs with Crosslinked Poly(Decyl Methacrylate) Membranes and Both Ionic Site and Ionophore Covalently Attached Salt with Covalently Attachable Ionophore and Ionic Site.

Pairing 3-sulfonylpropyl methacrylate with 2-(diisopropylamino)ethyl methacrylate gives an ammonium-sulfonate salt that has ionophore the protonated (2-(diisopropylamino) ethyl methacrylate) as the cation and the ionic site (3-sulfonylpropyl methacrylate) as anion. In this way both the ionophore and ionic site can be covalently attached to the membrane since both contain exactly the same methacrylate functional unit and together this ammonium-sulfonate salt is sufficiently soluble in the methacrylate matrix. Initial attempts to synthesize the 3-sulfonylpropyl methacrylate N-isopropyl-N-(2-(methacryloyloxy)ethyl)propan-2-ammonium salt through water/ether extraction gave <1% yield due to the large hydrophilicity of both the cation and anion. The subsequent use of water/ethyl acetate extraction did not give the desired compound either, possibly also due to side reactions resulting from the elevated temperature required for the evaporation of the ethyl acetate solvent. To prepare the desired salt, the 3-sulfonylpropyl methacrylate potassium salt was instead first passed through a strongly acidic cation exchanger column to yield the protonated 3-sulfonylpropyl methacrylate (i.e., the sulfonic acid) as an aqueous solution. Then it was added to 2-(diisopropylamino)ethyl methacrylate to form a solution of the ammonium salt, from which the water solvent was removed by freeze-drying to give the final product a viscous colorless liquid. The polymerization scheme for membrane with both the ionophore and ionic site covalently attached to the polymeric membrane matrix is shown below.

Reaction scheme for the preparation of crosslinked polymethacrylate membranes with both ionophore and ionic site covalently attached to the polymer backbone.

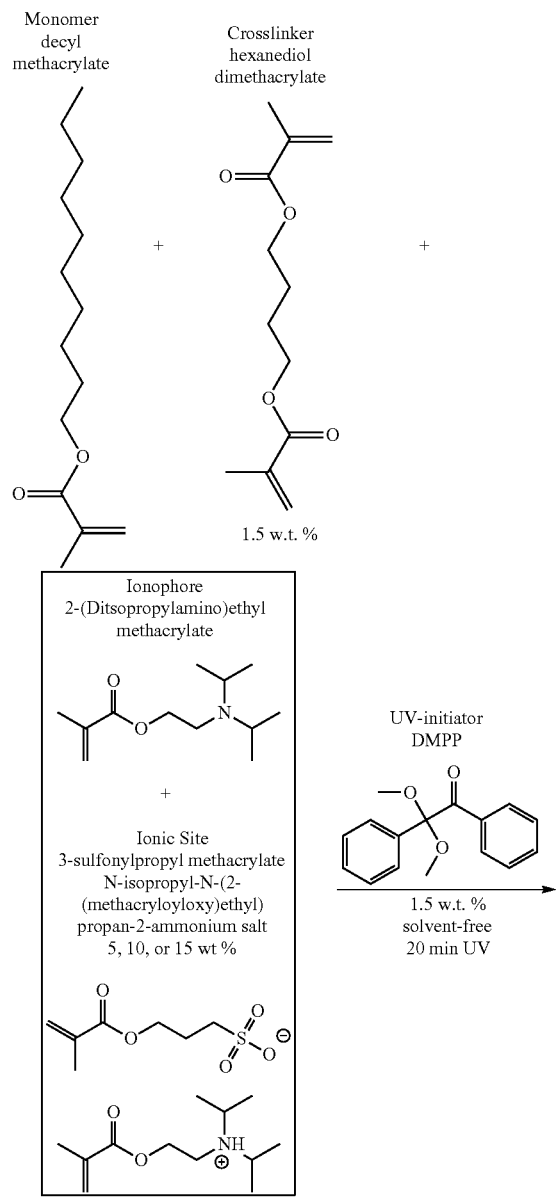

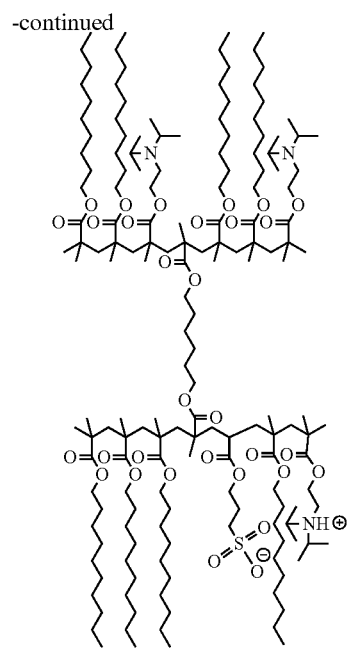

pH Response of Membranes with Ionophore and Ionic Site Both Covalently Attached.

Figure 13:
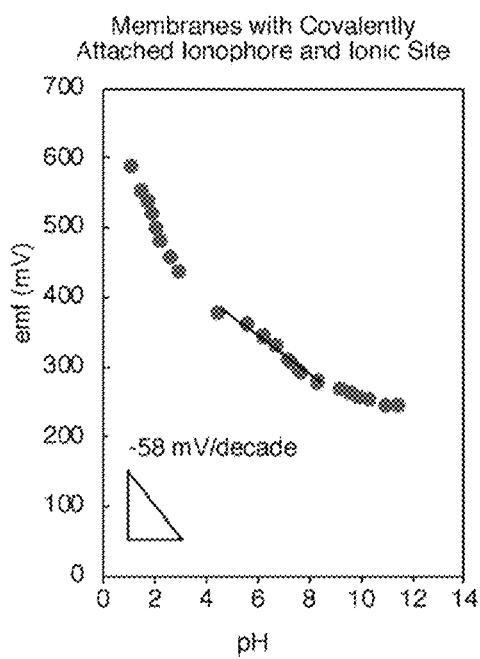
FIG. 13 is a graphical view of pH response of crosslinked poly(decyl methacrylate) copolymer membranes in a solid contact ISE set up with both ionophore and ionic site covalently attached.

See FIG. 13 for pH responses of crosslinked poly(decyl methacrylate) copolymer membranes in a solid contact ISE set up with both ionophore and ionic site covalently attached. EMF measurements were started at pH 12.0 (10 mM NaCl and 10 mM $NaH_2PO_4$ solution adjusted to pH 12). The pH was lowered by adding small aliquots of 1 M HCl solution. Average slope: 10.5±12.3 mV/decade (n=6).

Calibrations curves for ISEs with membranes that have the ionophore and ionic site both covalently attached did not give satisfactory Nernstian responses. Among six identical electrodes made, one electrode gave a slope of −27.6 mV/decade in the range from pH 4.6 to pH 8.2. The other five electrodes gave little to no response to pH in the range that is expected for this ionophore. Three of the electrodes gave an average membrane resistance of 68±115 G92 while the other three electrodes have membrane resistance that were too high to be measured with the shunt method.

The high resistance is clear evidence of low membrane ion mobility. To first verify if the covalent attachment occurred, elemental analysis and XPS were performed to identify the sulfur and nitrogen contents of these membranes. If the ionophore and ionic site were not covalently attached during the polymerization, they would be expected to have leached out of the sensing membrane into the aqueous solution completely due to their high hydrophilicity. No evidence for leaching was found by elemental analysis.

The invention claimed is:

1. An electrochemical sensor with an ion-selective membrane comprising a crosslinked alkyl methacrylate homopolymer or copolymer of two or more alkyl methacrylates with a covalently attached electrically neutral or electrically charged ionophore that is selective for a target cation or anion wherein the alkyl methacrylate homopolymer or copolymer of two or more alkyl methacrylates comprises alkyl groups that are substituted with multiple fluorine atoms, making the polymer fluorous.

2. The sensor of claim 1 comprising a high surface area carbon solid contact.

3. The sensor of claim 1 wherein the covalently attached ionophore is selective for $H^+$ and contains as a functional group a primary, secondary, or tertiary amine, or a heterocyclic aromatic hydrocarbon.

4. An electrochemical sensor comprising an ion-selective membrane, the sensor comprising a crosslinked alkyl methacrylate homopolymer or copolymer of two or more alkyl methacrylates with a covalently attached cationic or anionic ionic site wherein the covalently attached ionic site contains as a functional group a tetraphenylborate group; a sulfonate group; a sulfonylimide group; or a sulfonylimide group in which one or two alkyl substituents of the sulfonylimide has 1, 2, 3, 4, 5, 6, 7, 8, 9, 10, 11, 12, 13, 14, 15, 16, 17, or 18 fluorine atoms attached.

5. The sensor of claim 4 comprising a high surface area carbon solid contact.

6. The sensor of claim 4 prepared by polymerization of membrane components that comprise a salt that consists of an ion that comprises the ionic site functional group and a counter ion that is a complex of the ionophore and an exchangeable ion that may or may not be the target ion of the sensor.

7. An electrochemical sensor comprising an ion-selective membrane a crosslinked alkyl methacrylate homopolymer or copolymer of two or more alkyl methacrylates with a covalently attached cationic or anionic ionic site and covalently attached electrically neutral or electrically charged ionophore wherein the covalently attached ionic site contains as a functional group a tetraphenylborate group; a sulfonate group; a sulfonylimide group; or a sulfonylimide group in which one or two alkyl substituents of the sulfonylimide has 1, 2, 3, 4, 5, 6, 7, 8, 9, 10, 11, 12, 13, 14, 15, 16, 17, or 18 fluorine atoms attached.

8. The sensor of claim 7 comprising a high surface area carbon solid contact.

9. The sensor of claim 7 wherein the covalently attached ionophore is selective for $H^+$ and contains as a functional group a primary, secondary, or tertiary amine, or a heterocyclic aromatic hydrocarbon.

10. The sensor of claim 7 prepared by polymerization of membrane components that comprise a salt that consists of an ion that comprises the ionic site functional group and a counter ion that is a complex of the ionophore and an exchangeable ion that may or may not be the target ion of the sensor.

11. An electrochemical sensor comprising:
a sensor body; and
an ion-selective membrane disposed on or within the sensor body, the ion-selective membrane comprising a crosslinked alkyl methacrylate homopolymer or copolymer of two or more alkyl methacrylates with a covalently attached electrically neutral or electrically charged ionophore that is selective for a target cation or anion wherein the alkyl methacrylate homopolymer or copolymer of two or more alkyl methacrylates comprises alkyl groups that are substituted with multiple fluorine atoms, making the polymer fluorous.

12. The sensor of claim 11 comprising a high surface area carbon solid contact.

13. The sensor of claim 11 wherein the covalently attached ionophore is selective for $H^+$ and contains as a functional group a primary, secondary, or tertiary amine, or a heterocyclic aromatic hydrocarbon.

14. An electrochemical sensor comprising an ion-selective membrane, the sensor comprising a crosslinked alkyl methacrylate homopolymer or copolymer of two or more alkyl methacrylates with a covalently attached cationic or anionic ionic site wherein the alkyl methacrylate homopolymer or copolymer of two or more alkyl methacrylates comprises alkyl groups that are substituted with multiple fluorine atoms, making the polymer fluorous.

15. The sensor of claim 14 prepared by polymerization of membrane components that comprise a salt that consists of an ion that comprises the ionic site functional group and a counter ion that is a complex of the ionophore and an exchangeable ion that may or may not be the target ion of the sensor.

16. An electrochemical sensor comprising an ion-selective membrane a crosslinked alkyl methacrylate homopolymer or copolymer of two or more alkyl methacrylates with a covalently attached cationic or anionic ionic site and covalently attached electrically neutral or electrically charged ionophore wherein the alkyl methacrylate homopolymer or copolymer of two or more alkyl methacrylates comprises alkyl groups that are substituted with multiple fluorine atoms, making the polymer fluorous.

17. The sensor of claim 16 prepared by polymerization of membrane components that comprise a salt that consists of an ion that comprises the ionic site functional group and a counter ion that is a complex of the ionophore and an exchangeable ion that may or may not be the target ion of the sensor.

* * * * *